3,466,112
LOW NOISE PULSE EXPANSION USING A SCANNED OPTICAL CORRELATOR
MacLellan Emshwiller, Orange, N.J., assignor to Bell Telephone Laboratories, Incorporated, New York, N.Y., a corporation of New York
Filed Apr. 12, 1966, Se. No. 542,032
Int. Cl. G02f 1/28
U.S. Cl. 350—161                     5 Claims

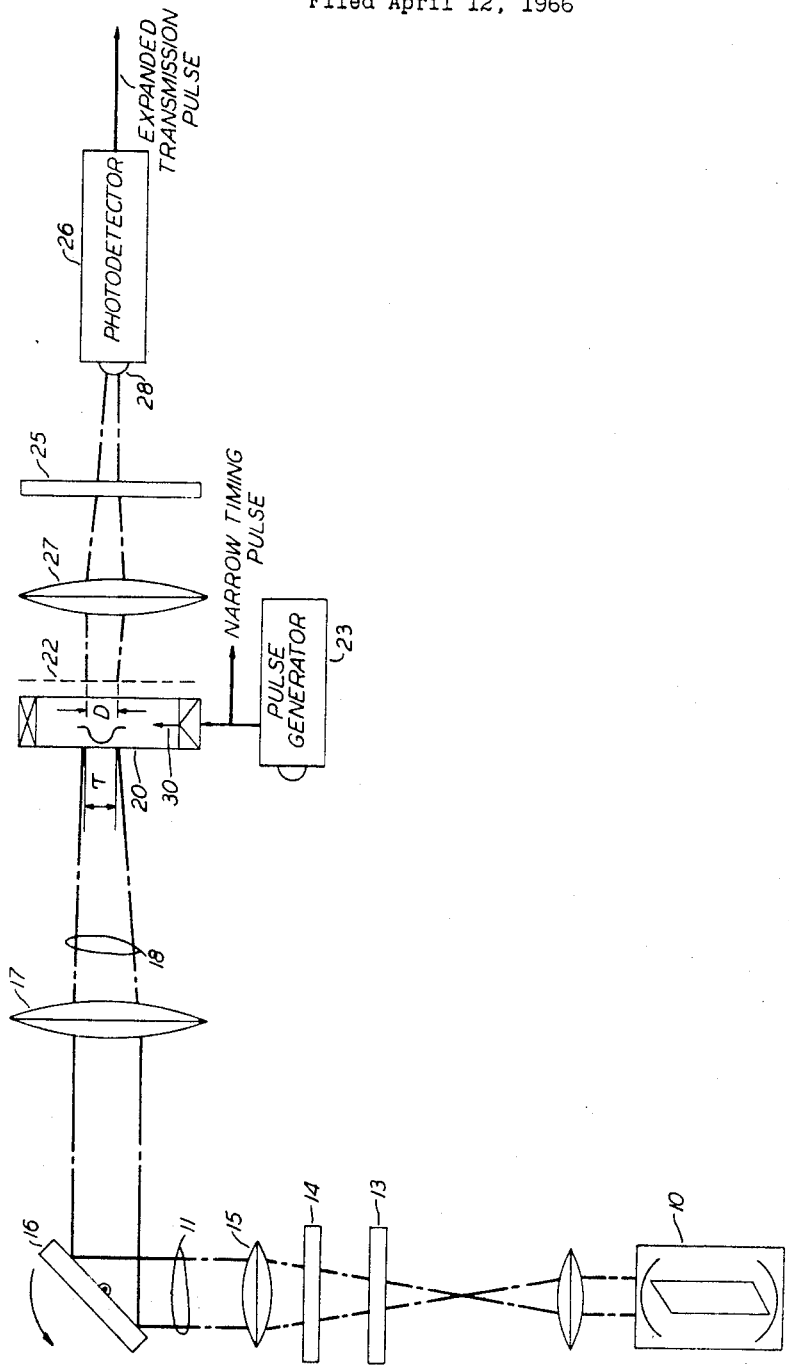
Sept. 9, 1969   MacLELLAN EMSHWILLER   3,466,112
LOW NOISE PULSE EXPANSION USING A SCANNED OPTICAL CORRELATOR
Filed April 12, 1966
INVENTOR
M. EMSHWILLER
BY
ATTORNEY

United States Patent Office 3,466,112
Patented Sept. 9, 1969

ABSTRACT OF THE DISCLOSURE

An optical correlator arrangement is utilized to obtain pulse expansion by illuminating a short acoustical pulse traversing an acoustical medium. The light transmitted through the medium is modulated by a correlator mask to obtain the expanded pulse frequency spectrum. The system noise is reduced by limiting illumination to the immediate region of the acoustical pulse traversing the medium.

---

This invention relates to optical correlators and more particularly to the expansion of electrical pulses through the interaction of optical and acoustical signals in an optical correlator.

In conventional pulse expansion schemes, utilizing optical correlators, a narrow acoustic pulse or disturbance is propagated through an illuminated transparent acoustic medium. The acoustic pulse diffracts the incident light and produces a modified optical wavefront. This modified optical wavefront scanned across a correlator mask generates a light signal of fluctuating intensity. The fluctuating light signal is then converted by a photosensitive device into an expanded electronic pulse having a duration equal to the time needed by the acoustic pulse to traverse the illuminated acoustic medium.

In the aforementioned conventional scheme the incident light illuminates the entire length or aperture of the acoustic medium. The narrow acoustic pulse or disturbance, however, exists in only a small fraction of that aperture. As a result thereof, only a fraction of the light incident upon the acoustic medium is diffracted by the acoustic pulse. The remainder of the light energy is either lost through absorption by opaque areas of the correlator mask or is transmitted as bias light through the transparent areas of the correlator mask.

A limited amount of this transmitted bias light is useful to permit homodyne detection of the modulated light signal by some photosensitive device. However, the only effective bias light for this purpose is that light which comes from the region of the acoustic pulse or disturbance and is coherent with the light diffracted by the acoustic pulse. The bias light passing through the undisturbed portion of the acoustic medium only generates noise in the photosensitive detector and is not effective for the purposes of signal detection.

It is apparent from the foregoing that the noise in the signal detected by the photosensitive device is proportional to the total illumination transmitted by the acoustic medium. On the other hand the useful signal detected by the photosensitive device is merely proportional to that fraction of the total illumination which illuminates the acoustic pulse or disturbance. Hence, the conventional method of pulse expansion by optical correlators inherently has a poor signal to noise ratio.

It is, therefore, a primary object of the present invention to improve the signal to noise ratio in electrical pulse expansion apparatus utilizing optical correlators.

It is another object of the present invention to illuminate only the signal producing region of the acoustic medium.

In accordance with the present invention, an optical correlator including an acoustic medium and a correlator mask is used to achieve low noise pulse expansion. A beam of elliptically polarized light illuminates a short acoustic pulse as it traverses a light transparent shear wave supporting acoustic medium. A rotating mirror causes the beam of elliptically polarized light to scan the length of the acoustic medium. Synchronism of the scanning beam and the traveling acoustic pulse is achieved by using the scanning beam to initiate the acoustic pulse in the acoustic medium, just prior to each scan of the acoustic medium. The shear wave in the pulsed acoustic medium induces a birefringence effect therein. This birefringent effect modulates the ellipticity of the incident beam of light as it passes through the acoustic medium. A correlator mask alternately transmits and interrupts the modulated light transmitted by the acoustic medium to generate a fluctuating light signal with a varying frequency spectrum as a function of time. A wave analyzer eliminates the major axis component of the elliptically polarized light and a photodetector then senses the intensity of the light that passes through the wave analyzer.

It is readily apparent from the foregoing therefore that the signal to noise ratio of applicant's pulse expansion apparatus is a substantial improvement over that of conventional pulse expansion apparatus. This improvement is achieved by utilizing a larger percentage of the illumination incident on the acoustic medium for signal producing purposes than has been possible in the past. This larger percentage is achieved by concentrating all of the available light onto the signal producing region of the acoustic medium. The concentration of light in a practical embodiment covers a somewhat larger width than the width of the acoustic pulse or disturbance it illuminates. This is to insure that the velocity of the diffracted light scanning the correlator mask is regulated by the velocity of the acoustic disturbance traversing the acoustic medium and not by the less accurate mechanical means controlling the scanning beam of light. The velocity of the scanning beam of light need only be sufficiently accurate to insure that the acoustic pulse remains within the illuminated area.

Other objects, advantages, the specific nature of the present invention, and its various features will appear more fully upon consideration of the specific illustrative embodiment now to be described in detail in connection with the accompanying drawing in which the drawing shows an illustrative optical correlator apparatus to expand electronic pulses in accordance with the present invention.

Referring now to the drawing, there is shown an optical correlator to expand electrical or electronic pulses in accordance with the present invention. As shown in the drawing, light is derived from a light source 10. The light source 10 may comprise any apparatus capable of generating a high intensity coherent beam of light. A laser light source is particularly suitable for this application. The light derived from the light source 10 is applied to a light polarized 13 which polarizes the light in a direction to be described hereinbelow. The polarizer 13 may comprise a Nichol prism or some other suitable equivalent device known in the art. The polarized light is passed through a compensator 14, wherein, it is elliptically polarized. The compensator 14 may comprise a quarter-wave plate consisting of a thin plate of calcite. The physical nature of polarizers and compensators and their effect upon light beams is well known in the art and it is not believed necessary to describe such phenomena herein in detail.

The elliptically polarized light derived from the compensator 14 is collimated by a collimating lens 15 and projected onto a rotating mirror 16. The mirror 16 rotates at some preselected constant angular velocity and causes the beam of light 11 incident upon it to scan an acoustic medium 20. The angular velocity of the mirror 16 is selected so that the linear velocity with which the beam of light scans the acoustic medium 20 is substantially equal to the linear velocity of a pulse or disturbance propagating through the medium. The rotating mirror 16 may comprise a single face, flat front surfaced mirror of the elliptical type and may be mounted on a shaft run by a synchronous motor. It is to be understood that various other means may be devised by those skilled in the art to scan a beam of light across the acoustic medium without departing from the spirit and scope of applicant's invention.

A focusing lens 17 is inserted in the optical path of the light beam reflected by mirror 16 onto the acoustic medium 20. The lens 17, which is equally spaced from the mirror 16 and the acoustic medium 20 by its focal length, focuses this beam so that the beam of light 18 is highly concentrated on the acoustic medium 20. This equal spacing insures that the direction of the incident light beam is maintained perpendicular to the propagation direction 30 as it scans the length of the acoustic medium.

The scanning beam of light 18, prior to the beginning of each scan of the acoustic medium 20, momentarily illuminates and activates a photosensitive pulse generator 23. The photosensitive pulse generator 23, in response to the activating beam 18, generates a short electrical or electronic timing pulse which is applied to the acoustic medium 20. The photosensitive pulse generator 23 includes timing circuits so that the short electronic timing pulse will initiate a narrow pulse or disturbance into the acoustic medium 20 at the exact moment the scanning beam of light 18 begins to scan the medium. The design of an appropriate pulse generator and timing circuit should be readily apparent to those skilled in the art; therefore, it is not believed necessary to give a detailed description of such apparatus.

The aforementioned timing pulse initiates a narrow pulse or disturbance within the acoustic medium 20. This narrow pulse or disturbance propagates through the acoustic medium 20 at some constant velocity along its propagation axis 30 as indicated in the drawing. The propagation velocity and length of the acoustic medium determines the duration of the expanded pulse.

The acoustic medium 20 is of the birefringence effect type and may comprise a delay media such as fused quartz. The narrow pulse or disturbance induced by the applied electronic pulse produces a narrow region in which the delay media becomes birefringent. This narrow birefringent region, of course, propagates along with the narrow pulse or disturbance. The narrow disturbance in an acoustic medium comprising fused quartz is a narrow shear wave which produces a propagating birefringence having two mutually perpendicular axes inclined at 45 degrees to the direction of propagation of the disturbance.

The scanning beam of light 18 is elliptically polarized so that the major axis of its ellipse is directed parallel to the direction 30 in which the disturbance is propagated through the medium. The induced birefringence modulates the incident elliptically polarized light beam 18. Specifically, the minor axis of the incident elliptically polarized light beam 18 is modulated in intensity as the light passes through the disturbed region in the medium.

The width $\tau$ of the scanning beam of light 18 as focused at the acoustic medium 20 is selected to be sufficiently large to illuminate the entire width D of the induced narrow pulse or disturbance and, in addition, a small part of the adjacent undisturbed portion of the medium. This overlap of illumination is to insure that the transmitted light modulated by the disturbance in the medium scans the subsequent correlator mask 22 at a velocity determined by the propagation velocity of the disturbance rather than by the angular velocity of the rotating mirror 16.

As is evident from the drawing, all the available elliptically polarized light is concentrated into a light beam 18 having a width $\tau$ which slightly exceeds the width D of the narrow pulse or disturbance in the acoustic medium 20. As explained hereinabove, the signal to noise ratio is largely determined by the fractional amount of the total incident illumination modulated by the narrow pulse or disturbance in the acoustic medium 20. Thus, as the width of the incident illumination on the acoustic medium approaches the width of the narrow pulse or disturbance, the signal to noise ratio is significantly improved.

The modulated elliptically polarized light passing through the acoustic medium 20 is applied to a correlator mask 22. The correlator mask 22 may comprise a light transmissive ruled grating. This grating may comprise alternately arranged transparent and opaque strips having a predetermined width and spacing. Many equivalent forms of correlator masks will readily suggest themselves to those skilled in the art without departing from the spirit and scope of applicant's invention and it is not believed necessary to describe such masks in detail.

The opaque strips of the correlator mask 22 interrupt the transmission of the modulated elliptically polarized light transmitted through the acoustic medium 20. The mask by alternately interrupting and transmitting this modulated light through its respective opaque and transparent strips or regions creates fluctuations in the intensity of the transmitted light. These fluctuations have a certain frequency spectrum determined by the width and spacing of the transparent and opaque strips of the mask. The frequency spectrum in the illustrative embodiment is one that increases in time as the disturbance propagates along the medium. However, many other useful frequency spectrums will suggest themselves to those in the art.

A lens 27 collects the light transmitted by the mask 22 and focuses it onto the small cathode 28 of the photodetector 26. The light, before striking the photodetector 26 passes through an analyzer 25 which filters out the axis of polarized light parallel to the direction of propagation in the acoustic medium and transmits only light polarized in the direction of the minor axis of the elliptically polarized light.

The photodetector 26 responds to the intensity of the light transmitted by the analyzer. The output of the photodetector 26 is thus an electrical signal which is an expanded electronic pulse with a duration equal to the period of time needed by the disturbance to propagate through the acoustic medium 20. The frequency spectrum of this expanded pulse is equal to the fluctuation rate of the detected light.

It should thus be apparent to those skilled in the art that applicant's invention has achieved a significant improvement in the signal to noise ratio of optical correlators utilized for pulse expansion by concentrating all the available illumination in the signal producing region of the correlator. In addition, it is apparent that applicant can achieve a very uniform frequency spectrum in his expanded pulse by controlling the scanning velocity of the correlator mask with the propagation velocity of acoustic pulse.

It is to be understood that the above-described embodiment of applicant's invention is merely illustrative of one particular embodiment of the priciples of the present invention. Many other embodiments may readily be devised by those skilled in the art without departing from the spirit and scope of the invention.

What is claimed is:

1. An optical correlator comprising a source of coherent light, means to elliptically polarize said coherent light, a light transparent shear wave supporting acoustic medium, means to generate a narrow acoustical pulse in said acoustical medium, means to focus said elliptically polarized light into a beam whose width approximately equals the width of said narrow acoustic pulse, means to scan said acoustic means with said beam of elliptically polarized light, said means to scan including means responsive to said elliptically polarized beam of light to activate said means to generate an acoustic pulse and timing means to apply said acoustic pulse to said acoustic medium in synchronization with the scanning of said acoustic medium by said elliptically polarized beam of light so that said elliptically polarized beam of light advances across said acoustic medium coincident with and to illuminate said acoustic pulse as it traverses said acoustic medium, correlator mask means to alternately interrupt and transmit the light transmitted through said acoustic medium, wave analyzer means for blocking the transmission of one polarization component of said elliptically polarized light as transmitted through said acoustic medium, and means to detect the intensity of light transmitted by said wave analyzer.

2. An optical correlator as defined in claim 1 wherein said scanning means comprises a mirror, means to rotate said mirror and means to direct said elliptically polarized beam of light normal to the direction of propagation in said acoustic medium as said beam of light scans said acoustic medium.

3. An optical correlator as defined in claim 2 wherein said acoustic medium comprises a material with birefringent properties responsive to induced acoustical disturbances.

4. An optical correlator as defined in claim 3 wherein said width of said beam of light is greater in size than said width of said acoustic pulse, the width of said beam of light being sufficiently large to permit continuous illumination of the entire width of said acoustic pulse regardless of variations in the scanning velocity of said beam of light.

5. An optical correlator as defined in claim 4 wherein the source of coherent light comprises a laser light source and said correlator mask means comprises a grating with a plurality of alternately opaque and transparent strips, said strips being spaced in accordance with a preselected frequency spectrum.

References Cited
UNITED STATES PATENTS

| | | | |
|---|---|---|---|
| 2,879,337 | 3/1959 | Reis | 179—15.55 |
| 3,365,579 | 1/1968 | Emshwiller | 250—199 |
| 3,365,581 | 1/1968 | Tell et al. | 250—199 |

RONALD L. WIBERT, Primary Examiner

PAUL K. GODWIN, Assistant Examiner

U.S. Cl. X.R.

350—6